United States Patent Office 2,736,102
Patented Feb. 28, 1956

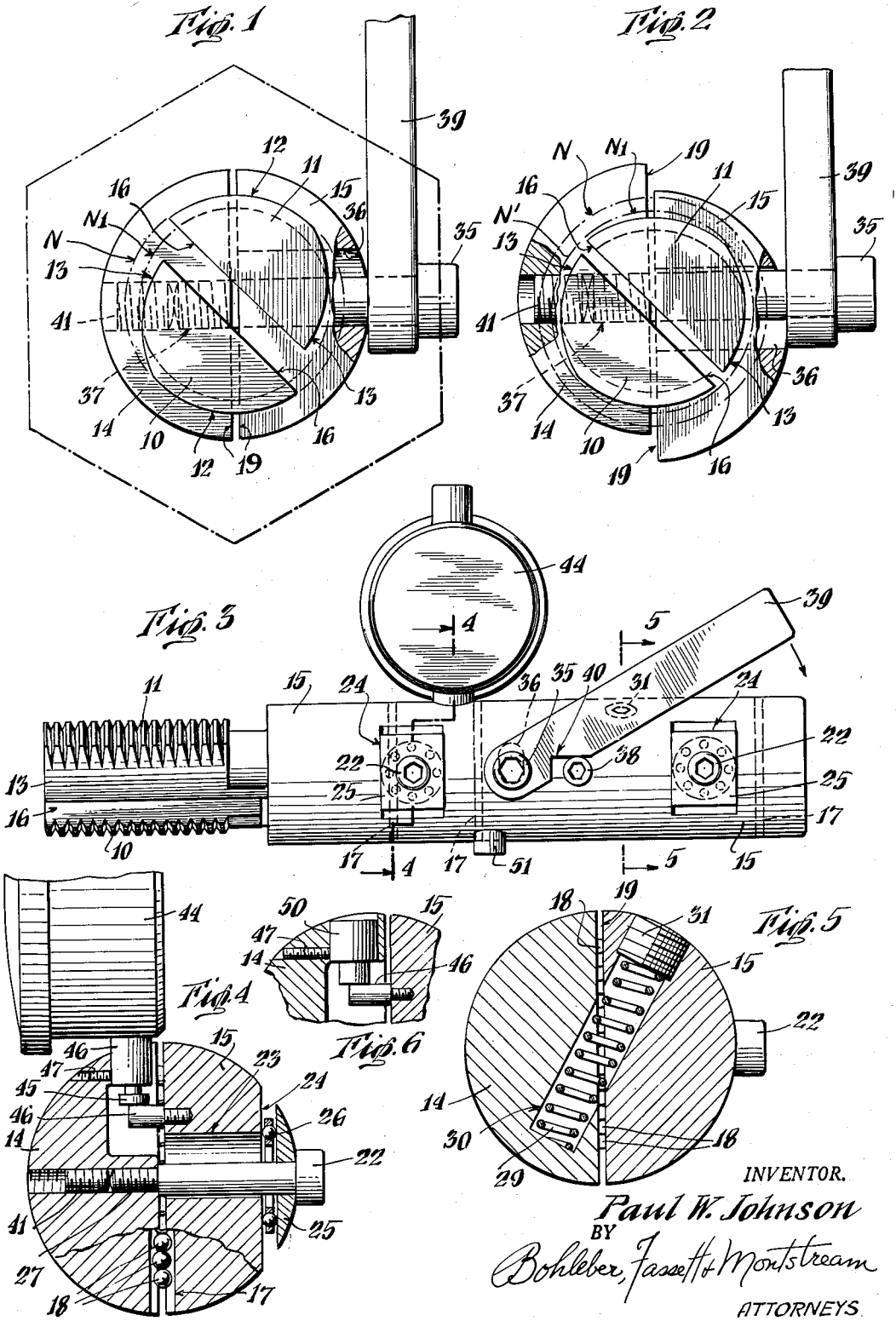

2,736,102

CONTRACTIBLE PLUG GAGE

Paul W. Johnson, Bloomfield, Conn., assignor, by mesne assignments, to The Johnson Gage Development Company, a corporation of Connecticut Application January 24, 1950, Serial No. 140,336

12 Claims. (Cl. 33—199)

The invention relates to a plug snap gage for gaging the internal dimension of a hole which may be either cylindrical or conical. The gage may carry an indicator to enable the deviation from a perfect part to be determined or it may be of the limit type as desired. The gage is particularly suited for gaging internal threads as well as internal surfaces which are grooved or ridged.

It is an object of the invention to construct a snap plug gage having two cooperating gaging members in segmental form at least one of which is movable relatively towards and away from the other at an angle in the region of 45° with respect to the chordal or parting surfaces of the gage members. This direction or plane of movement may be expressed also as on a plane approximately at the mid point of the gaging surface which is full or complete on the outer periphery of the gage members.

Another object of the invention is to construct a gage as aforesaid and in which the gage members are mounted for movement or at least one thereof so that the latter move parallel with respect to each other without any or any appreciable longitudinal angular variation.

Other objects of the invention will appear from the following description when taken in connection with the accompanying drawings showing one embodiment thereof in which:

Figure 1 is an end view of the plug type gage for internal screw threads in expanded relation as it would be within a threaded hole such as that of a nut shown in dot-dash lines;

Figure 2 is an end view of the gage of Figure 1 in contracted position preparatory to being inserted in a threaded hole;

Figure 3 is a plan view of the gage;

Figure 4 is a cross section taken on line 4—4 of Figure 3;

Figure 5 is a cross section taken on line 5—5 of Figure 3; and

Figure 6 is a fragmental section as in Figure 4 showing a stop plug replacing the dial indicator.

The gage is of the contractile type in that it is contracted for axial insertion within a hole and then expanded for gaging contact with a surface or thread of a test part to be gaged. Although the gage shown is cylindrical, it is applicable to conical holes in which case the plug segments or members will be conical. Although the gage finds its greatest usefulness for gaging internal threads, it has advantages over a solid plug gage for plain surfaces in that it can be reground when worn and it is easily inserted particularly when the test hole is close to minimum diameter in which case a solid plug is inserted with difficulty.

The gage includes a pair of complementary or cooperating gage members 10 and 11 each forming essentially a segment which is a little less than half of a cylindrical or conical plug. The outer periphery of each gage member has a gaging surface, a portion 12 of which conforms to the arc of the internal surface of a hole to be gaged, and if it is an internal screw thread to be gaged, then this portion has a full formed external thread which includes approximately one half of the periphery of the gaging member. The gaging surface on both gaging members will engage about one half or more of the surface to be gaged. The remaining portion 13 of the outer periphery of each segment or gage member constitutes a clearance portion, that is, it is cut away from the gaging arcuate surface to form clearance when the gage is contracted for the axial insertion and removal of the plug into and out of the hole to be gaged. Greater clearance is needed, of course, for a threaded, grooved or ridged hole than for one which is plain or smooth.

For a screw threaded, grooved or ridged peripheral gaging surface, the clearance portion may be an arc on a circle having a radius slightly less than the minimum diameter $N_1$ of the threaded, grooved, or ridged hole when the two gaging members or segments are in collapsed or contracted position, as illustrated in Figure 2, with the two peripheral arcs merging at or about at the mid point of the outer periphery. This enables the gaging members to move together or be contracted to the minimum diameter $N_1$ of the threaded hole so that the gage may be removed or inserted axially with respect to the hole or internal screw thread. In the clearance portion of the periphery, the tops of the screw threads are preferably progressively reduced so that there is some portion of a gaging thread extending as far as possible into the clearance portion. It will be observed that the arcuate gaging surface of full gaging thread 12 or surface for each member is diametrically opposite from that of the other. Likewise the clearance portion 13 or remaining portion of the outer periphery of each gaging member is diametrically opposite that of the other.

The gaging members or segments 10 and 11 as described above are mounted for relative movement at an angle within the region of 45° with respect to the chord 16 of the segments. This may be expressed in another manner, namely: the movement is approximately on a diametrical or radial plane of the cylindrical gage, mid way between the peripheral surface of the full gaging portion of the members. Actually whether one member is stationary and the other moves relatively thereto or both members move relatively to the other is of no importance in the form of construction particularly illustrated; however, one member may be secured to a frame if desired in which case this member would be a stationary or fixed member. The mounting means, by which this movement of the two gaging members or of one member with respect to the other is secured, may take many forms.

The mounting means for the two gaging members is shown as a handle projecting rearwardly from the gaging members and particularly a handle of a cylindrical form when the gaging members are in their extended or expanded relation. The cylindrical handle is split diametrically at 19 or practically diametrically to form a two part handle of parts 14 and 15 and the diametrical plane of each handle extends at an angle within a region of 45° with respect to the chord between the ends of the periphery of the gaging members or the plane of the adjacent chordal faces 16 of the gage members. The angular relationship of 45° is not precise and may vary at least from 30° to 60° and hence it is defined as a region of 45°. The most effective angular relationship is one in which the plane of movement is 45° or approximately 45° with respect to the chordal plane 16 of the gaging members. The diametrical faces may serve as a slide surface between the two members; however, in order to permit easier movement between the two half sections of the handle, the diametrical face of each is provided with at least two cross grooves, three being shown, in which balls 18 are received. The two sections or parts therefore, in the ball mounted form, shift relatively to each other or one with respect to the other upon the balls in the grooves, there being sufficient clearance between the faces 19 to permit the balls to carry the relative movement. In either construction a diametrical slide or guiding means is provided at an angle with respect to the chordal surfaces 16 of the gaging members.

The two half portions of the gage handle may be secured together for relative movement therebetween in any suitable fashion. The construction of securing means particularly shown embodies a pair of like devices spaced from each other and each includes a screw 22 which passes through a slot 23 in half portion 15 and is threaded at 27 into the other half portion 14. The half portion 15 has a slide 24 for each securing means which may be merely a channel cut into the outer surface thereof each channel being spaced from the other. A guide 25 is received in each slide or channel and held in place by the screw. A thrust type of ball bearing 26 may be inserted between the guide 25 and the bottom of slide 24 to permit free movement therebetween. The securing means permit relative movement of the handle parts 14 and 15 which results in the gaging members 10 and 11 being moved towards and away from each other. The balls 18 in their respective groove 17 retain the handle parts and the gaging members in axial alignment; however, the securing means also aid in maintaining alignment and may be used as the sole aligning means when accurately fitted.

Preferably means are provided to normally propel the two handle parts 14 and 15 relatively to each other and the gage members to expanded position which may take many forms. Preferably a spring 29 provides resilient means for relative lateral movement between the handle parts and expansion of the gage members. This may be accomplished by providing a spring hole 30 extending into the two members which hole is at an angle closely adjacent to the diametrical slide faces 19 of the handle parts to form a recess for the spring. A short screw 31 is threaded into the open end of the spring hole to put compression in the spring and to retain the latter in place in the hole.

Suitable means may be provided to contract or collapse the gage segments or members against the tension of the expanding spring 30. A simple form of means is illustrated in Figure 3. It constitutes a screw 35 passing through an elongated hole or slot 36 in the handle part 15 which screw is secured in the other handle part 14 by means of the screw threads 37 in a fashion similar to that of the screw 22 shown in Figure 4. Adjacent the screw 35, an abutment is provided, the simplest form being a second screw 38 secured to the movable handle part 15. An operating lever or trigger 39 is pivotally mounted upon the screw 35 and has a notch 40 which engages the abutment or head of the screw 38. Pivoting of the trigger therefore propels the screw 38 and the movable handle part 15 downwardly which brings the gaging members 10 and 11 to collapsed relation or position. A lock screw 41 may be used to lock the screw 35 against unloosening.

The gage is shown as an indicating type in that a dial indicator 44 is mounted upon one handle part 14 and its operating button 45 is engaged by an abutment such as a screw 46 which is anchored or threaded into the other portion 15 of the handle. The dial indicator is mounted upon the handle part 14 by its stem 46 being retained in a hole in the handle part. A screw 47 retains the stem within the hole. When the gaging members are contracted, inserted within a test hole to be gaged and released, the spring 29 propels the handle parts relatively to each other, or one relatively to the other, and opens the gaging members to engage the internal surface or thread. The extent of opening movement or expansion of the gaging members is indicated by the screw 46 engaging the operating button 45 of the dial indicator 44 to give a reading thereon.

The indicator 44 may be replaced by a screw, plug or stop 50 as shown in Figure 6, which limits the expanding movement of the gage segments or members to the desired dimension whereupon an oversize hole or internal thread may be determined by the looseness of the internally threaded member or holed member upon the expanded gaging members. Or a simple screw stop 51 may be used screwed into one handle part and the other handle part engaging the head to limit the extent of movement.

Each of the gage members has a full gaging surface or thread approximately one quarter of the peripheral surface so that both gage members together provide full contact over approximately one half of the surface to be gaged. For internal screw threads a varying portion of the thread is engaged in the clearance quadrant of each gage member. To test the full internal surface or thread, the test part is rotated on the gage member or the gage is rotated in the test hole. The clearance arcs 13 serve as a cam in the rotation; hence it is desirable to rotate the gage in the direction of the clearance arcs although this is not essential.

This invention is presented to fill a need for improvements in a contractible plug gage. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A contractible plug gage for gaging internal surfaces comprising a pair of complementary gage members each forming a segment whose outer periphery is less than half of a circle in cross section and having a chord between the ends of the outer periphery, an arcuate gaging surface on a portion of the outer periphery of each gage member conforming to the arc of the internal surface of a hole of the desired size, the arcuate gaging surface of each gaging member being diametrically opposite that of the other gaging member, the remaining portion of the outer periphery of each gaging member being a clearance portion of a lesser dimension and each being diametrically opposite that of the other gaging member, means movably mounting at least one gage member with respect to the other for relative movement towards and away from each other in a plane in the region of forty-five degrees with respect to the chord of the gage members, and means spaced from the gage members for contraction of the gage members.

2. A contractible plug gage as in claim 1 in which the remaining portion of the outer periphery is an arcuate surface having a radius less than that of the gaging surface and merging with the arcuate surface of the gaging surface.

3. A contractible screw thread plug gage for internal threads comprising a pair of complementary gage members each forming a segment whose outer periphery is less than half of a circle in cross section and having a chord between the ends of the outer periphery, an arcuate screw threaded gaging surface on a portion of the outer periphery of each gage member conforming to the arc of the desired internal screw thread, the threaded gaging surface of each member being diametrically opposite that of the other member, the remaining portion of the outer periphery of each gaging member being a clearance portion of a lesser dimension than the minimum diameter of the internal thread of a test part and each clearance portion being diametrically opposite that of the other member, means movably mounting at least one gage member with respect to the other for relative movement towards and away from each other in a plane in the region of forty-five degrees with respect to the chord of the gage members to contract the over all dimension of the gage members to less than the minimum diameter of the screw thread to be tested, and means spaced from the gage members to contract the same.

4. A contractible screw thread plug gage as in claim 3 in which the remaining portion of the outer periphery of each gage member is an arcuate surface having a radius less than that of the outer periphery of the screw threaded gaging surface and merging with the latter.

5. A contractible plug gage comprising a pair of complementary gage members each forming a segment whose outer periphery is less than half of a circle in cross section and having a chord between the ends of the outer periphery, an arcuate gaging surface on the outer periphery of each gage member conforming to the arc of the internal surface of a hole of the desired size, the gage members being diametrically opposite each other, the arcuate gaging surfaces of each member being diametrically opposite each other, the remaining portion of the outer periphery of each gaging member being of a lesser dimension for clearance and each diametrically opposite the other; means movably mounting at least one gage member with respect to the other including a handle part extending from an end of each gage member, and a sliding means upon each handle part for relative movement at an angle in the region of forty-five degrees with respect to the chord of the gage members; and means to movably secure the handle parts together.

6. A contractible plug gage as in claim 5 including a diagonal hole extending into each handle part, and a spring in the diagonal hole.

7. A contractible plug gage as in claim 6 including lever means carried by one handle part and engaging the other handle part to move the handle parts relatively to each other and contract the gage members against the tension of the spring.

8. A contractible plug gage as in claim 5 in which the diametrical sliding means includes a diametrical surface upon each handle part facing each other, a plurality of grooves extending crosswise in each surface, and ball means in each groove.

9. A contractible plug gage as in claim 5 in which the securing means for the handle parts includes a pair of spaced slots carried by one part, a channel in the slotted part at each slot, a screw for each slot carried by the other part and extending through a slot, and a guide carried by each screw and received in the channel.

10. A contractible plug gage as in claim 9 including a ball bearing between each guide and channel.

11. A contractible plug gage as in claim 5 including indicator means carried by one handle part and an abutment carried by the other handle part to operate the indicator means.

12. A contractible plug gage as in claim 5 including stop means to limit the expansible movement of the handle part.

References Cited in the file of this patent

UNITED STATES PATENTS

| 1,625,462 | Frauenthal | Apr. 19, 1927 |
| 1,859,063 | Aldeborgh | May 17, 1932 |
| 1,961,647 | Sonoda | June 5, 1934 |
| 2,427,924 | Rose | Sept. 23, 1947 |

FOREIGN PATENTS

| 568,301 | Great Britain | Mar. 28, 1945 |
| 104,875 | Sweden | Apr. 29, 1942 |